# United States Patent Office 3,359,556
Patented Dec. 19, 1967

3,359,556
PULSE DOPPLER RADARS
Henri Jean Bosc, Paris, Gerard Marie Edouard van den
Broek d'Obrenan, Versailles, and Jean-Marie Henri
Colin, Sceaux, France, and Jean Marie Villemagne, deceased, late of Issy-les-Moulineaux, France, by Jeanne
Anne Marie Marquet, Michael Marie Pierre Villemagne,
and Bernadette Lucie Andree Marie Villemagne, co-administrators, all of Issy-les-Moulineaux, France, assignors to International Standard Electric Corporation, New
York, N.Y., a corporation of Delaware
Filed Dec. 13, 1965, Ser. No. 531,639
Claims priority, application France, Dec. 14, 1964,
998,546, Patent 1,438,257
10 Claims. (Cl. 343—17.2)

ABSTRACT OF THE DISCLOSURE

A Doppler radar in which Doppler output signal is rapidly sampled and stored repeatedly at regular intervals. Sampling and storage is repeated a great many times during each one of the periods between transmitted radio-frequency pulses. Two separate and complete storage devices are employed. Storage in and readout from each device is performed alternately. In other words, storage in one is performed while readout from the other is performed, and vice versa. The information stored is used to provide a video input to a cathode-ray tube indicator. By using two complete storage devices, a separate video channel for each target range is obviated. Yet, the information is stored for a sufficient, although short length of time, for the target video to be developed and used by the indicator. In particular, the information in one storage device is complete for readout during a complete readout period and this information is not changed over the entire readout period. Change is not permitted because simultaneous storage and readout are prevented in the self same storage device. Transient effects and discontinuities attendant upon simultaneous storage and readout therefore do not adversely affect the development of video and its subsequent display on the indicator. Binary digital encoding and decoding may be used with magnetic core memory, if desired.

The invention concerns pulse Doppler radars which make use of the Doppler effect for detecting moving targets and suppressing echoes due to fixed obstacles.

It is known that in pulse Doppler radars, the signals received in response to the transmitted pulses are applied to a phase detection circuit which compares the phase of said signals to that of the signals supplied by an oscillator known as "coherent oscillator," which is blocked at each repetition period and unblocked at the beginning of each period while, at the same time, a fraction of the transmitted energy is injected to it. It keeps thus, during the whole repetition period, the memory of the phase of the transmitted wave. With this phase comparison, generally carried out after a frequency heterodyning, one obtains constant amplitude pulses from one repetition period to the other for signals received after reflection on fixed obstacles, and pulses which are amplitude modulated at the Doppler frequency for signals obtained after reflection on moving targets. Such radars are well known and a description thereof may be found in chapter 4 of the book of Merrill—I. Skolnik, entitled, "Introduction to Radar Systems," published in 1962 by McGraw-Hill Book Company, New York.

The Doppler frequency $fd$ is related to the radial velocity V of the moving target with respect to the radar and to the wavelength $\lambda$ of the transmitted wave by the formula $$fd = \frac{2V}{\lambda}$$

The output signals of the radar are usually utilized in two different ways:

(1) In certain types of radars the difference between the output signals in the course of successive repetition periods is carried out in such a way as that operation is made between signals corresponding to the same distance. This difference suppresses the fixed echoes, the amplitudes of which are identical from one repetition period to the other and shows up the moving targets.

(2) In other types of radars one samples after each transmitted pulse and for a given range zone, the output signal of the detector. This is made, for instance, by means of a range strobe pulse applied to this detector, the sampled signal being applied to a pass-band filter which suppresses the components resulting from this sampling and which gives a signal at the Doppler frequency of the moving target. The surveillance zone of such a radar is limted to the range zone corresponding to one strobe pulse (one microsecond for instance, viz. a distance of one hundred and fifty meters). In order to increase the width of this zone, one uses a plurality of such range strobe pulses which are equally spaced in time and which shift slowly. This results in a stroboscopic sampling which allows to explore the whole range of the radar as it is described in the French patent H. Tanter—G. E. van den Broek 3.1 entitled, "Moving Targets Electromagnetic Detecting Systems," and its patents of addition: H. Tanter et al. 4.2—H. Tanter et al. 6.4—G. E. van den Broek et al. 8.1—deposited by the applicant.

The first process does not enable to obtain neither a good suppression of the echoes obtained after reflection on fixed obstacles nor a good discrimination of the speeds of the moving obstacles.

The second process does not present the drawbacks quoted hereabove but requires the use of an important and expensive material owing to the utilization of numerous devices in parallel.

This second process may be at the limit carried out by means of adjacent strobe pulses of fixed position covering all the range zone to be explored. Thus if one uses mircosecond strobe pulses, one hundred of such pulses will be required in order to explore simultaneously a zone of fifteen kilometers, this requiring one hundred exploitation devices in parallel.

The object of the present invention is thus to obtain, in a pulse Doppler radar, an optimum suppression of fixed echoes, a maximum sensitivity as well as a discrimination of the speeds of the moving obstacles, by using a reduced material.

The present invention will be particularly described with reference to the accompanying drawings in which.

Figure 1:
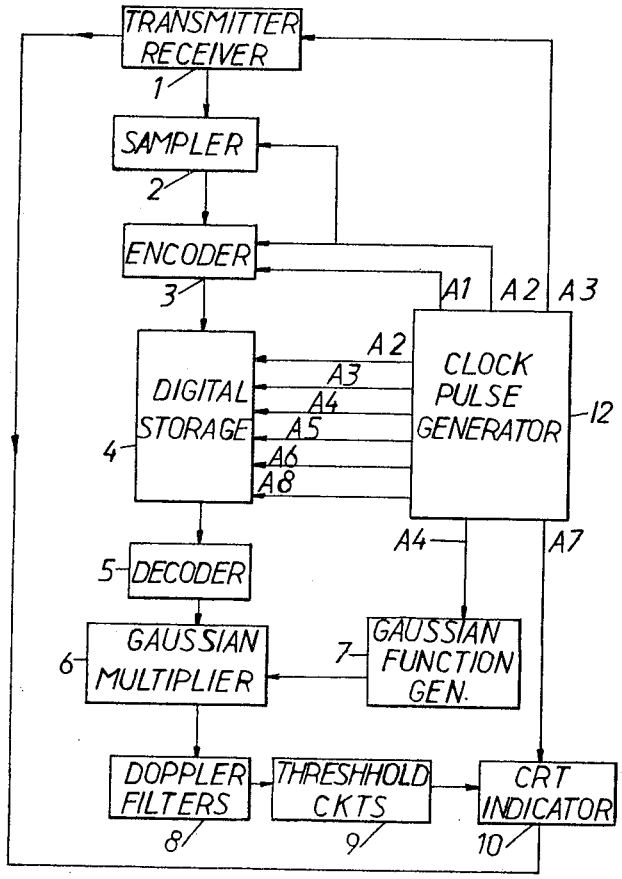
FIGURE 1 is a general diagram of a mode of realization of a pulse Doppler radar presenting the characteristics of the present invention.

FIGURE 1 represents the general diagram of a mode of realization of a pulse Doppler radar which makes use of the characteristics of the present invention. On this figure, the device referenced 1 represents the transmitter and the receiver of such a radar which may be identical to those described in the book "Introduction to Radar Systems," quoted hereabove (page 118, FIGURES 4-6). The repetition frequency $fr$, 4,000 cycles for instance, viz. a period $$T = \frac{1}{fr} = 250 \text{ microseconds}$$

of the pulses is determined by a clock unit referenced 12 which delivers, on the conductor A3, pulses at the frequency $fr$. The receiver includes, after the intermediate frequency amplifier, a phase detector which receives first the signals coming from said amplifier, and second the signals at the intermediate frequency supplied by the "coherent oscillator." This latter is constituted by an oscillator which is blocked at the end of each repetition period and unblocked at the beginning of the next period while, at the same time, a fraction of the transmitted energy is injected to it. It keeps thus, during the whole repetition period, the phase memory of the wave transmitted. The output signals of the device 1, which are delivered by the phase detector and which are constituted by pulses the time position of which—with respect to the transmitted pulse—characterize the distance of the obstacle which has produced them, said pulses being of constant amplitude in the case of fixed obstacles and amplitude modulated at the Doppler frequency in the case of moving obstacles. These pulses are applied to a sampling device 2 which samples the signal, for instance, into fractions of one microsecond duration. The choice of the duration of a sample is conditioned by the range resolution which has to be obtained and which corresponds, in the particular case of one microsecond, to a range zone of one hundred and fifty metres. The amplitudes of these samples are coded afterwards in a coder 3 which, in the considered example, is a binary coder which supplies, for each sample, a $p$-digit binary code group appearing in parallel form over $p$ output wires. The code group corresponding to one single sample is recorded in one of the two memories referenced 4 (these memories are equipped, for instance, with magnetic cores) which operate alternatively at the writing and at the reading. Each of said memories comprises $p$ planes and each plane is organized in $m$ lines and $n$ columns. Each one of the $p$ digits of the code group is stored in a core having the same coordinates in each plane and thus, the selection circuits are common to all the planes.

In the course of the description, when the reading or the writing of a code will be dealt with, the $p$ homologous cores of the $p$ planes in which the code is written will be designated by the coordinates of any one of these cores in the plane to which it belongs.

The $n$ code groups corresponding to the $n$ samples obtained successively in the course of one repetition period of duration $$T = \frac{1}{fr}$$

are stored successively in the $n$ positions of a given memory line, this line being provisionally assigned to this repetition period. The samples coming from successive repetition periods are written in successive lines so that the informations corresponding to $m$ successive repetition periods may be stored in the memory. Since the $n$ samples are removed successively and regularly during one repetition period, the $x$th sample corresponds to echoes received after reflection on obstacles located at a distance $Px/n$ from the radar, if P designates the range of the radar. It is therefore understood that all the code groups stored in the $x$th column represent the echoes received in the course of $m$ repetition periods by reflection over a same obstacle located at a distance $Px/n$ from the radar.

As it will appear further on, during the description of the exploitation of the informations thus written, the history of the echoes received after reflection over one obstacle located at a given distance from the radar in the course of $m$ repetition periods is examined, and this successively for all the $n$ range zones defined by the $n$ samples obtained in the course of each repetition period. Therefore, as soon as $m \times n$ codes corresponding to $m$ repetition periods are stored in one memory, the contents of this memory are exploited by reading successively the data stored in the first column, then in the second one, and so on. During this time, the second memory is used for writing as it has been stated hereabove.

It will be noted that, since the $n$ samples have to be written in a time equal to the repetition period $$T = \frac{1}{fr}$$

of the radar, the duration of write selection of a core will have to be at most equal to $T/n$, or $1/nfr$. This will also be the maximum selection time of a core during the readout if one of the memories has to be read while the other one is used for writing.

The different signals which are necessary for the write and read operations of the memories are present over the conductors referenced A2, A3, A4, A5, A6, A8 coming from the clock unit 12. The logical operation of said memory will be studied more in detail in relation with FIGURE 3.

In certain applications it is not necessary to have available all the informations corresponding to the complete duration T of the repetition period and one may examine only a fraction of the total range of the radar which can be moved through the repetition period. In this case one applies to the coder 3 only the output signals of the radar 1 which correspond to targets which are in this zone.

If the column read corresponds to a distance at which is located a moving target, the $m$ signals which are read result from a sampling made at the frequency $fr$ of the amplitude modulated signal at the Doppler frequency corresponding to this moving target. Since the read operation is carried out at the frequency $nfr$, the Doppler frequencies are multiplied by a factor $n$ if writing and reading speeds are identical. If said speeds are not identical, this factor $n$ must be multiplied by a number equal to the ratio between the reading and writing speeds.

The signals extracted from one column are applied to a decoder 5 which delivers signals which are sent to a device referenced 6 wherein they are multiplied by a factor which varies progressively from the beginning to the end of the reading of the column with a maximum at the middle of the column. The various values of said factor are those of a Gaussian function in the particular example described in the present patent.

In effect, the signals read in a memory may present amplitude discontinuities from one column to the following one which introduce, in the frequency spectrum, some components which may lie in the pass-band of the Doppler filters 8 and may have enough energy to give, at the output of said filters, a signal which is then interpreted as the Doppler signal of a moving target. In order to avoid these false echoes, the signals read at the beginning and at the end of each column are attenuated so that their energy be insufficient for energizing the Doppler filters. A solution consists in multiplying the signals read over one column by a factor $k$ which varies progressively from the beginning to the end of the reading of a column with a maximum at the middle. This multiplication (or modulation) suppresses part of the received power, this being a drawback for the signals corresponding to moving targets. However this loss of energy may be made minimized by taking, as variation function of the factor $k$, a Gaussian function; such a function presenting the best compromise between the power loss and the spectrum width. This Gaussian function is elaborated in the circuit 7 synchronized by the selection signal of the columns at the reading which is present over the conductor A4.

The signals delivered by the circuit 6 are said to be "weighted" and they are applied to a set of Doppler filters 8, each filter having a pass-band corresponding to a given range of radial speeds. Owing to the multiplication of frequencies by $n$ due to the reading, the filters are centered on frequencies $n$ times higher than the real Doppler frequencies which makes easier to design the filters, particularly for low Doppler frequencies. The use of a set of filters is advantageous with respect to a single wide pass-band filter, since the resulting noise is lower and it allows, furthermore, to obtain an indication of speeds.

The signals delivered by the set of filters 8 are applied to the oscilloscope 10 after passing through a threshold circuit 9 which eliminates the noise by allowing passage only to the signals higher than this threshold. Said oscilloscope is suitably scanned and synchronized by the clock unit 12 and it receives also the information of rotation of the antenna supplied by the transmitter-receiver 1. The range sweep of the oscilloscope may be realized in two different ways, either by a rapid sweep synchronized by each pulse of the radar, or by a slow sweep synchronized by the reading of the memory. In the first case the output signals of each column are, after exploitation in the Doppler filters stored in digital or analog form in the associated storage cell of a memory with one line and $n$ columns. It is assumed that this memory is of the non-destructive readout type, the information in each cell being modified each time that the results of the exploitation of the data extracted from the associated column of the memory which is read are available. The data contained in the $n$ cells of this memory are read in synchronism with the sweep and the signals read are used either for the control of the vertical sweep or for the control of the modulation according to whether the presentation system is of the type A, of the type B, or of the type PPI. In the second case, which is the one considered in the example of realization, the duration of the range sweep is that of the reading of a memory, viz. a time equal to $mT$. The range of information is thus given by the column by column reading, said readout beginning obviously by the column corresponding to the closest distance from the radar. This last solution is the one shown on FIGURES 1 and 2.

Figure 2:
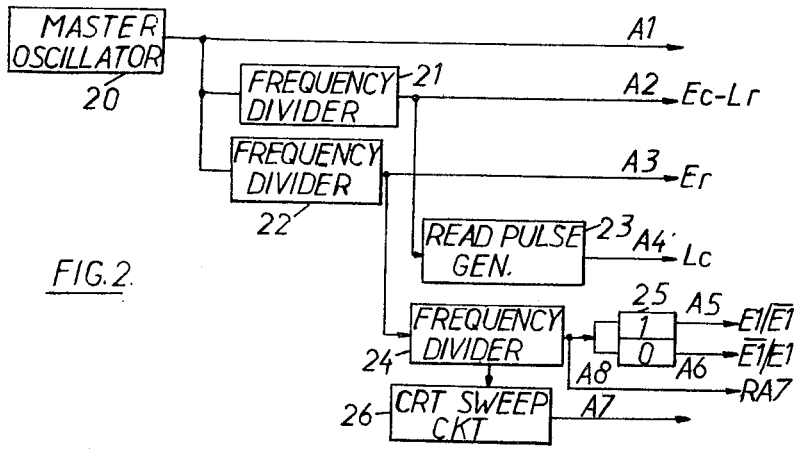
FIGURE 2 represents a mode of elaboration of the signals required for the operation and for the synchronization of the radar presenting the characteristics of the present invention.

One will now explain, in relation with FIGURE 2, the mode of elaboration of the signals delivered by the clock unit 12 on conductors A1, A2, A3, A4, A5, A6, A7, A8. In this figure, the master oscillator 20 delivers on the conductor A1 signals at the maximum frequency required in the radar realized according to the present invention, i.e. the frequency corresponding to the elementary times necessary for the coding operations, viz. a frequency of thirty two mcs.

This frequency is divided by thirty two by the circuit 21 and one obtains thus, on the conductor A2, the one microsecond pulses required for sampling, for coding, for the column selection at writing, and for the line selection at reading.

These signals will be referenced Ec of Lr because they are used particularly of the selection of the columns during writing and for the selection of the lines or rows during reading.

The repetition frequency $fr=4,000$ c./s. is obtained by successive divisions of the fequency thirty two mcs. in the circuit 22. The signal which is present on A3 will be referenced Er because it is used particularly for the line selection during writing.

The column selection signal during reading, which is referenced Lc and which appears on the conductor A4 is elaborated by the circuit 23 which divides by $m$ the frequency of the signals Ec or Lr present on the conductor A2.

The circuit referenced 24 divides the frequency $fr$ by $m$ and the pulses of frequency $fr/m$ which it delivers control the state of the bistable circuit 25 which sets either from the 0 state to the 1 state for one pulse, in which case the output conductors A5 and A6 deliver respectively a signal E1 and its complement $\overline{E1}$ or from the 1 state to the 0 state for the following pulse and a signal E1 is present on A6 whereas A5 presents a signal $\overline{E1}$.

The output conductor A8 of the divider 24 delivers pulses at the frequency $fr/m$ which are used also for the resetting to zero (referenced RAZ) of some of the elements.

Last, the sweep signals for the oscilloscope are supplied by the circuit 26 which divides the frequency $fr$ by $m$ and which delivers on A7 a sawtooth wave of duration $mT$.

Figure 3:
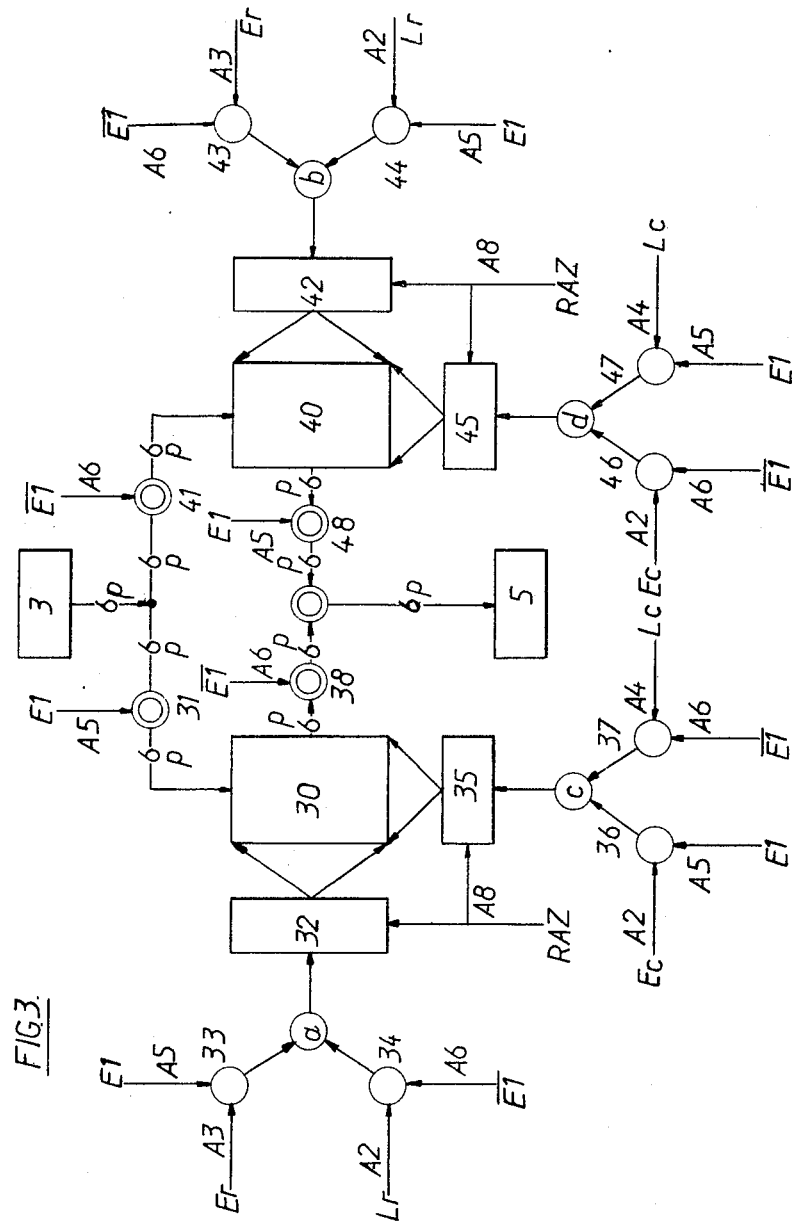
FIGURE 3 represents the logical diagram of the access circuits of the memories.

These various signals are used in particular for the writing and the reading of the memory the operation of which will be studied using FIGURE 3.

On this FIGURE 3, the elements 30 and 40 represent two ferrite core memories each one having $p$ planes of $m$ lines and $n$ columns and in which the simultaneous selection of $p$ homologous elements in the $p$ planes is made by current coincidence. This process is described in chapter 3 of the book of C. J. Quartly, entitled "Square-Loop Ferrite Circuitry," published by Iliffe Books Ltd., London, in 1962.

On this figure, the symbol referenced 31 designates $p$ electronic gates which allow passage to the signals coming from the coder 3 only when the signal E1 is present on the conductor A5 (FIGURES 2 and 3), the activation of these gates enabling the writing in the memory 30.

During the writing time of this memory, the signal $\overline{E1}$ is present on the conductor A6 (FIGURES 2 and 3) connected to each one of the $p$ electronic gates referenced 31 and prevents the passage of the signals coming from the coder 3.

When the signals on the conductors A5 and A6 are inverted, A5 presents the signal $\overline{E1}$ which blocks the gates 31 and A6 presents the signal E1 which allows passage of the signals coming from the coder 3 in order to record them in the memory 40. The same thing happens for the $p$ reading gates 48 associated to the memory 30 and for the $p$ reading gates 48 associated to the memory 40.

When the signal E1 is present on A5, it opens the gates 31, 33 and 36 this enabling the recording of the code group in the memory 30 which receives thus the signals Er of line selection during writing through a counter-decoder 32 as well as the signals Ec of column selection during writing through a counter-decoder 35. During this time, the gates 44, 47 and 48 are also opened by the signal E1 and enable the passage of the signals read in the memory 40 into the decoder 5; in effect, the memory 40 does receive the signals Lr of line selection during reading through the counter-decoder 42 and the signals Lc of column selection during reading through the counter-decoder 45, the output gate 48 being opened by the signal E1. These counter-decoders as designated by their name, are constituted by a counter having at least $m$ positions for the elements 32 and 42, and $n$ positions for the elements 35 and 45 the advance of which from one position to the next one is controlled by the signals Er or Lr for the first ones, and by the signals Ec or Lc for the second ones; the counter being cleared by the signal RAZ which is present on the output conductor A8 of the element 24 of FIGURE 2. This counter is followed by a decoder, constituted by diodes for instance, which supplies one of the $m$ line selection conductors or one of the $n$ column selection conductors for each position of the counter.

The letters $a$, $b$, $c$, $d$, $e$ surrunded by a circle represent electronic gates "OR" which allow passage in the case of $a$, to either the signals coming from 33 or those coming from 34.

It is easily seen that when one inverts the signals E1 and $\overline{E1}$ which are present respectively on conductors A5 and A6, the memory 40 is in the writing position and the memory 30 is in the reading position.

While the principles of the above invention have been described in connection with specific embodiments and particular modifications thereof, it is to be clearly under-

What is claimed is:

1. In a pulse Doppler radar system which includes transmitting means for radiating radar pulses, means for receiving echoes of said radar pulses reflected by distant objects, and coherent phase detection means within said receiving means for providing video signals in which the instantaneous signal amplitudes are a function of the phase difference of said received echoes as compared to the phase of electromagnetic energy with said radiated pulses, the combination which comprises: means for sampling at least a portion of each repetition period successively in range increments representative of the pulse amplitude from said phase detection means within said increment; first and second storage means each containing a plurality of digital storage elements arranged to store said digital code groups for a plurality of range increments over a plurality of repetition periods; means for reading said storage means by successive range increments at a rate independent of the storage rate to produce a composite digital output signal; decoding means responsive to said composite digital output signal for producing a composite video signal representative of the video signals over a plurality of said repetition periods; means for signal weighting by multiplying said video signals by a factor which varies from a low value at the beginning of each reading cycle, passes through a maximum and thereafter decreases toward the end of said reading cycle; filter means responsive to said weighted video for passing only those signals having amplitude modulation values corresponding to predetermined Doppler frequencies; and control means associated with the timing functions of said radar system for switching between said first and second storage means such that one of said storage means is read while the other is receiving data to be stored.

2. The invention set forth in claim 1 in which said means for signal weighting is defined as multiplication by a factor having the amplitude-versus-time shape of a Gaussian curve.

3. The invention set forth in claim 1 in which said means for reading said storage means is defined as including means to effect said reading at a rate substantially higher than the storage rate whereby the Doppler frequencies represented in said storage means are increased for convenience in the subsequent filtering operation.

4. A pulse Doppler radar system comprising: radar transmitting means for radiating pulses of electromagnetic energy at a predetermined repetition frequency; means for receiving echoes of said radiated pulses reflected by distant objects; detection means connected to said receiving means for providing a signal train during each repetition period in which the instantaneous signal amplitudes are a function of the phase difference of the received echo as compared to the phase of said electromagnetic energy of said radiated pulses; means connected to said detection means for sampling a predetermined portion of said repetition period successively in range increments and for generating a $p$ digit code group for each of said increments representative of the pulse amplitude from said detection means within said increment; first and second storage means each including a plurality of digital storage elements arranged in a matrix of $p$ planes with each of said planes organized in $m$ lines and $n$ columns; means for storing in said first storage means one digit of each of said $p$ digit codes in each of said planes at the same $m$ and $n$ coordinates, successive $p$ digit code groups each corresponding to one of said range increments within a given one of said repetition intervals being stored one digit to each plane at successive $n$ coordinates along a given line corresponding to said given repetition interval, and the corresponding data from the next successive repetition interval being stored on the next successive line, decoding means for sampling the stored information in said first memory progressively through said columns and for generating a second signal train containing pulse signal information the instantaneous amplitude of which corresponds to the corresponding magnitude of the digital data stored in successive columns; means for weighting the signals decoded from said columns by multiplying the signals read therefrom by a factor which varies progressively through a maximum from the begining to the end of the reading of each of said columns; filtering means connected to receive said weighed signals for passing to an output only those frequency components representing the Doppler frequencies corresponding to moving object signals; and means for alternating functions between said first and second storage means whereby one of said storage means is read while the other is receiving new signals.

5. The invention set forth in claim 4 further defined in that said means for weighting the signals decoded comprises means for multiplying the amplitudes of said decoded signals by a function having the amplitude-versus-time shape of a Gaussian curve over the duration of the time of reading of each of said columns.

6. The invention set forth in claim 5 further defined in that said means for sampling said stored information comprises means for reading said stored information at a rate which is a predetermined multiple of the storage rate whereby the coded Doppler frequency components are increased whereby said filtering means may be more discriminating, and said function having the amplitude-versus-time shape of a Gaussian curve has a time duration substantially equal to the time of reading of one of said columns of data and is repeated for each subsequent column read.

7. The invention set forth in claim 4 in which said digital storage elements each comprises a high speed memory core of the square-loop ferrite type.

8. The invention set forth in claim 4 comprising additional means including a cathode-ray tube presentation synchronized with said radar transmitting and receiving means whereby the output of said filtering means is presented as a visual display substantially only of moving objects.

9. In a Doppler radar including a transmitter and a receiver for producing a Doppler output signal representative of the location and velocity of a target, the combination comprising: a synchronizing clock pulse generator for operating said transmitter and receiver; means for producing samples of said Doppler signal periodically and repeatedly during each period between transmitted radio-frequency pulses; first and second storage devices; means responsive to the output of said clock pulse generator for recording all of the said samples occurring in alternate ones of said periods in said first storage device; means for recording the samples produced in the remaining periods in said second storage device; means for reading out the samples in said second storage device during said alternate periods; means for reading out the samples in said first storage device during said remaining periods, whereby simultaneous recording and reading are avoided in both of said devices, the said readouts from said devices producing target video signals; and means responsive to said video signals for indicating the location of targets within the range of said radar.

10. The invention as defined in claim 9, wherein said means for producing samples includes an encoder for converting each sample into a binary digital code, said storage devices including magnetic core memories, said means for reading out said recorded samples including a binary digital decoder.

References Cited

UNITED STATES PATENTS 3,162,852  12/1964  Altovsky et al. _____ 343—17.1

RODNEY D. BENNETT, *Primary Examiner.*

J. P. MORRIS, *Assistant Examiner.*